P. W. JENSEN.
HALTER.
APPLICATION FILED JULY 12, 1921.

1,410,573.

Patented Mar. 28, 1922.

Inventor
P. W. Jensen.

By Lacey & Lacey
Attorneys

UNITED STATES PATENT OFFICE.

PETER W. JENSEN, OF PRINCETON, MINNESOTA.

HALTER.

1,410,573.

Specification of Letters Patent.

Patented Mar. 28, 1922.

Application filed July 12, 1921. Serial No. 484,136.

*To all whom it may concern:*

Be it known that I, PETER W. JENSEN, a citizen of the United States, residing at Princeton, in the county of Mille Lacs and State of Minnesota, have invented certain new and useful Improvements in Halters, of which the following is a specification.

This invention is a halter for cattle and has for its object the provision of an inexpensive, strong and durable halter which may be easily fitted upon the head of the animal and which will, when in position, be comfortable but efficient to prevent straying of the animal.

The invention is illustrated in the accompanying drawings, in which—

Figure 1:
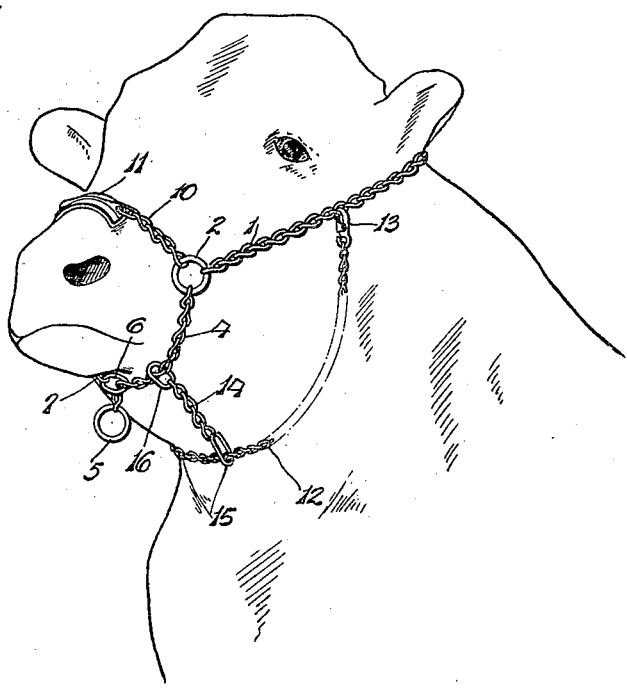
Figure 1 is a perspective view of a halter constructed in accordance with my invention and illustrating the position of the device when in use.
Figure 2:
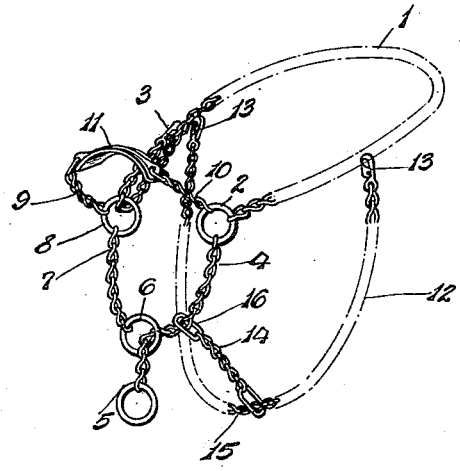
Figure 2 is a perspective view of the halter removed.

The headstall consists of a chain 1 which is connected at one end to a ring 2 and equipped at its opposite end with a snap hook 3. A second chain 4 is also connected to the ring 2 and is equipped at its free end with a ring 5 to which a hitching or leading strap may be attached, the intermediate portion of the chain 4 passing through a ring 6 as shown. A third chain 7 connects the ring 6 with a third ring 8 and short chains 9 and 10 are attached to the rings 8 and 2, respectively, the chains 9 and 10 being connected by an arched nose plate 11, the concave surface of this nose plate being smooth and fitting comfortably over the nose of the animal without causing any soreness. A throat chain 12 is equipped with snap hooks 13 at its ends which are engaged in links of the headstall chain 1 at the sides of the animal's head and a short chain 14 connects the chain 12 with the jaw chain 4. The chain 14 is provided at its ends with rings or long links 15 and 16, the chain 12 passing through the link 15 and the chain 4 passing through the link 16. The chain 14, connected to the throat chain 12 and the jaw chain 4, prevents the latter slipping out under the jaw and over the nose.

The headstall chain 1 is passed over the neck of the animal back of the ears and the rings 2 and 8 are disposed at the sides of the animal's cheeks so that the nose plate 11 will be held in its proper position. The snap hook 3 is passed through the ring 8 and then carried up and engaged in one of the links of the chain 1, the headstall being thus very easily adjusted to the size of the animal's head. The chain 12 is passed through the link 15 and the snap hooks 13 engaged in the chain 1 at points determined by the size of the animal's head and the link 16 engaged with the chain 4 to hold the same in proper position. To engage the link 16 over the chain 4, the link is inserted through the ring 6 from the rear and then slipped over the ring 5 after which it is drawn back through the ring 6, being thus easily connected and disconnected. The improved halter will be effectually held in place but will readily yield to the movement of the animal's head in feeding or exercising without becoming detached.

My improved halter is obviously simple and inexpensive, may be easily fitted upon the animal, and is strong and durable.

Having thus described the invention, what is claimed as new is:

A halter for cattle comprising a headstall chain adapted to pass over the neck and around the head of the animal and equipped at one end with a snap hook, a ring secured to the opposite end of the said chain, a second ring through which the headstall chain is engaged, an arched plate between and loosely connected with said rings, a chain extending from said second ring under the lower jaw of the animal, a ring at the free end of said last-mentioned chain, a chain attached at one end to the first-mentioned ring and extending loosely through the last-mentioned ring and having its free end adapted to receive a hitching strap, a throat chain adjustably attached to the headstall chain at the side of the animal's head, and a short chain connecting the throat chain with the chain adapted to receive a hitching strap.

In testimony whereof I affix my signature.

PETER W. JENSEN. [L. S.]